United States Patent [19]

Maines

[11] 4,183,323

[45] Jan. 15, 1980

[54] PET DRYER

[76] Inventor: Ben Maines, 1907 Judson Rd., Longview, Tex. 75601

[21] Appl. No.: 824,444

[22] Filed: Aug. 15, 1977

[51] Int. Cl.$^2$ .......................... A01K 1/02; A01K 13/00
[52] U.S. Cl. ........................................ 119/19; 119/160
[58] Field of Search .................... 119/19, 160, 37, 15; 34/231

[56] References Cited

U.S. PATENT DOCUMENTS

| | | | |
|---|---|---|---|
| 2,335,173 | 11/1943 | Corey | 119/21 |
| 2,898,691 | 8/1959 | Moseman et al. | 24/231 |
| 3,237,599 | 3/1966 | Torrey et al. | 119/19 |
| 3,985,102 | 10/1976 | Yonezawa | 119/160 |

*Primary Examiner*—Hugh R. Chamblee
*Attorney, Agent, or Firm*—Wofford, Fails & Zobal

[57] ABSTRACT

Dryer apparatus for drying and fluffing the coating of a pet characterized by a cabinet having one or more chambers with removable partitions and a perforated false bottom so as to allow circulation of warm air upwardly past the pet to dry and fluff the pet's coating. The cabinet has a warm air inlet near its bottom and connected below the perforated false bottom for supplying the warm air; and a exhaust air outlet near its top for discharging the moist air that has been circulated past the pet. The transparent window is disposed in one of the walls of each of the cabinets for viewing the pets during the drying and fluffing of its coating. A heater and air circulator are connected with the air inlet and, preferably, with an outside source of air. The outlet is connected exteriorly of the room in which the dryer is located and preferably at a second location different from the source of inlet air so as to avoid recirculating the moist air. Also disclosed are preferred embodiments and interconnections.

4 Claims, 4 Drawing Figures

PET DRYER

BACKGROUND OF THE INVENTION

1. Field of the Invention: This invention relates to apparatus for drying and fluffing the coating of a pet. More particularly, this invention relates to an apparatus incorporating air circulating means and heating means for flowing air past a pet's coating for drying and fluffing it.

2. Description of the Prior Art:

The prior art has seen the development of a wide variety of apparatus for drying and fluffing a pet ranging from large combs, through hand held electric dryers, to large stationary cabinets and heaters. All of the apparatus of the prior art has required an excessively long time to obtain the desired drying and fluffing. Moreover, with a large stationary cabinets and heaters, care had to be taken to prevent overheating of the animal, or pet. Also, the heating and drying had to be interrupted periodically for the fluffing; or the fluffing carried out near the end of the drying cycle, again making the operation expensive.

From the foregoing it can be seen that the prior art has not provided a totally satisfactory method or apparatus for drying and fluffing the coating of a pet.

SUMMARY OF THE INVENTION

Accordingly, it is an object of this invention to provide method and apparatus that enables automatically drying and fluffing the coating of a pet and obviating the disadvantages of the prior art apparatus.

It is a specific object of this invention to provide method and apparatus for fluffing and drying the coating of a pet that avoids manually handling of the coating to obtain the desired fluff, yet avoids the risk of overheating the pet.

These and other objects will become apparent from the descriptive matter hereinafter, particularly when taken in conjunction with the appended drawings.

In accordance with one embodiment of this invention, there is provided an apparatus for drying and fluffing the coating of a pet comprising: (a) a cabinet having a plurality of walls, including a door, defining at least one chamber large enough for a pet to stand upright therewithin; (b) an exhaust air outlet means near the top of the chamber for discharging warm moist air; (c) a perforated false bottom disposed in the chamber near the bottom so as to allow room for the pet to stand on the perforated false bottom and having openings smaller than the feet of the pet so as to prevent the proturding of the pet's feet therethrough, yet allowing passage of warm air upwardly around the pet; (d) warm air inlet means near the bottom of the chamber and connected below the perforated false bottom for supplying the warm dry air for drying and fluffing the coating of the pet; and (e) a transparent window disposed in one of the walls for viewing the pet during the drying and fluffing of its coating. Preferably, the apparatus includes a blower means for circulating the air and connected via suitable duct means and heating means for heating the air to a desired temperature for drying and fluffing the pet's coating.

In another embodiment of this invention, there is provided a method of drying and fluffing the coating of a pet characterized by the steps of bringing in inlet air from the attic of a building in which the pet is to be dried, heating the air, emplacing the pet over a perforated false bottom; circulating the heated air upwardly past the pet to dry and fluff the coating of the pet; and discharging the moist air after it is passed over the pet exteriorly of a wall of the room.

A BRIEF DESCRIPTION OF THE DRAWINGS

DESCRIPTION OF THE PREFERRED EMBODIMENT(S)

Figure 1:
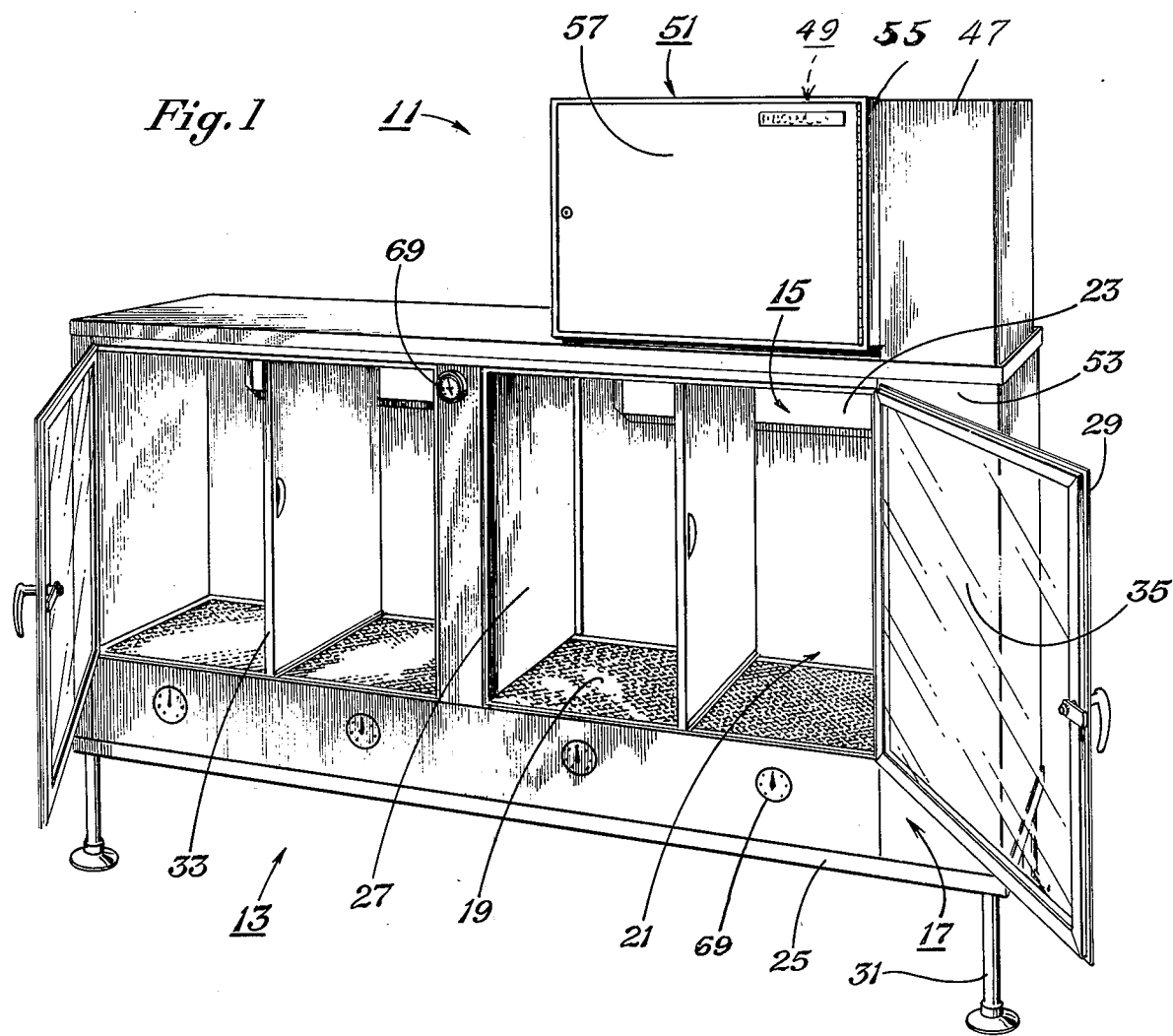
FIG. 1 is a front perspective view of one embodiment of this invention, with the doors open.

This invention can be employed for drying and fluffing the coating of any of the several pets that require such fluffing. For the most part, dogs and cats will be the pets that will be dried and fluffed in this invention.

Referring to FIGS. 1–4, there is illustrated apparatus 11 for drying and fluffing the coating of a pet. The apparatus 11 includes a cabinet 13, an exhaust air outlet means 15, and a warm air inlet means 17.

The apparatus 11 includes a perforated false bottom 19 for supporting the pet or the like as air is blown upwardly thereabout for fluffing and drying the coating of the pet.

The cabinet 13 has a plurality of walls that define at least one chamber 21. Each chamber 21 is large enough for the pet to stand upright therewithin for having its coating fluffed and dried. The plurality of walls comprise respective sets of six walls for each chamber and each set includes a top 23, FIG. 3, a bottom 25, a plurality of sides 27, 28 and at least one door 29. As illustrated, the cabinet 13 has four legs 31 with two chambers 21. Each chamber 21 has a removable partition 33. The removable partition 33 allows subdividing each chamber 21 into two or more subchambers for a plurality of respective smaller pets.

Also as illustrated, the top 23 comprises a panel with stiffened edges. The bottom 25 comprises a drain pan with a drain 37 to facilitate washing down and cleaning the cabinet 13. A support structure 39 is provided for supporting the drain pan bottom 25. A front panel 41 supports the doors 29 and their frames in which they are suspended for pivotal opening. One of the walls comprises back panel 43. Another of the walls comprises a stationary middle partition 45. The sides 27, 28 are disposed at the right and left hand sides of the cabinet 13.

The cabinet 13 is formed of galvanized sheet metal, such as galvanized iron. Any other material having the requisite strength and ease of cleaning can be employed. For example, the other material may comprise other metals such as stainless steel, aluminum and the like, or it may comprise plastic such as polyvinyl chloride, acrylonitrile butadiene styrene copolymer (ABS), polyethylene, or polypropylene. If desired, a structural skeleton may be employed for additional strength.

The apparatus 11 includes a transparent window 35 disposed in one of the walls for viewing the pet during the drying and fluffing of its coating. As illustrated, each transparent window 35 is disposed in each door 29. The window is formed of plexiglass (poly methyl methacrylate), although glass or other transparent material can be employed. Thus, the pet can be watched as warm air is blown about the pet; as via suitable ducts and the like.

Specifically, the apparatus 11 includes a duct means 47 connected with the warm air inlet means; heating means 49 disposed in fluid communication with the duct means 47; and air circulating means 51 for circulating the air past the heating means 49 and the pet.

The duct means 47 includes an end chamber 53 that is connected with the downstream end of a plenum 55 housing the heating means 49. The end chamber 53 is defined by respective encompassing walls exteriorly of the right hand side 27. The bottom of the end chamber 53 is closed with an opening to the left in communication with the space above the drain bottom 25 and below the perforated false bottom 19. Consequently, an air flow space is defined for flowing warm air beneath the perforated false bottom and upwardly through the perforations and past the pet.

The perforated false bottom 19 has support for the feet of the pet and has sufficient openings for the warm air to flow upwardly around the pet to fluff and dry its coating after the air has been heated by the heating means 49.

The heating means 49 may comprise any of the conventional heating units. The heating unit should be capable of heating the air to at least about 90° F. Preferably, the heating unit should have a controller such as a two stage thermostat or the like to heat it to the desired temperature regardless of the temperature of the outside air. As illustrated, an electric heating unit is employed. A satisfactory heating unit is a Lennox ES2D Direct Dry model.

Figure 2:
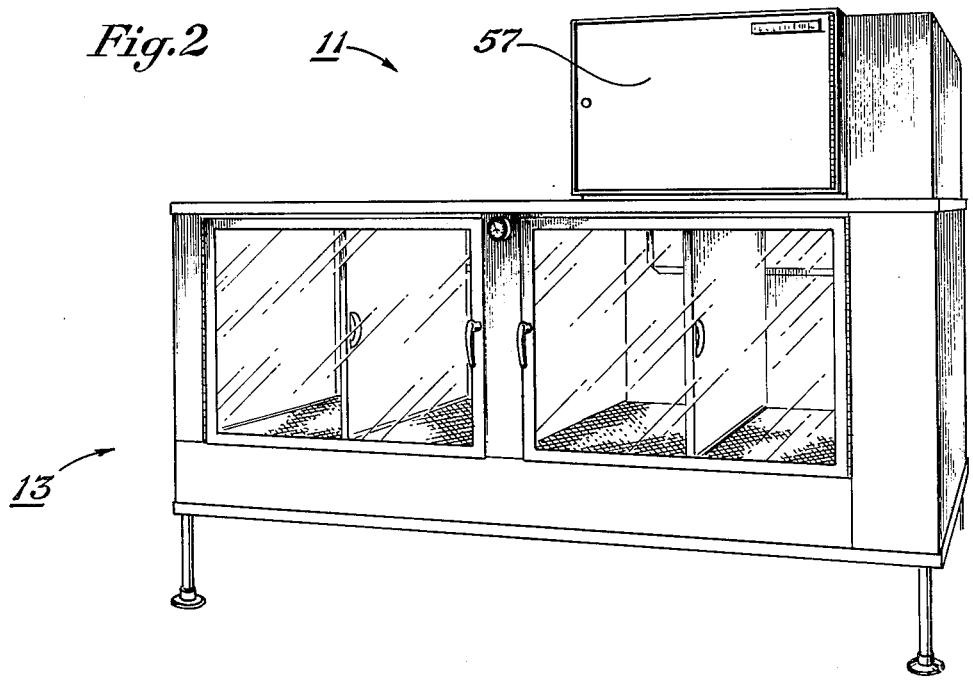
FIG. 2 is a partial front perspective view of the embodiment of FIG. 1 with the doors closed.
Figure 3:
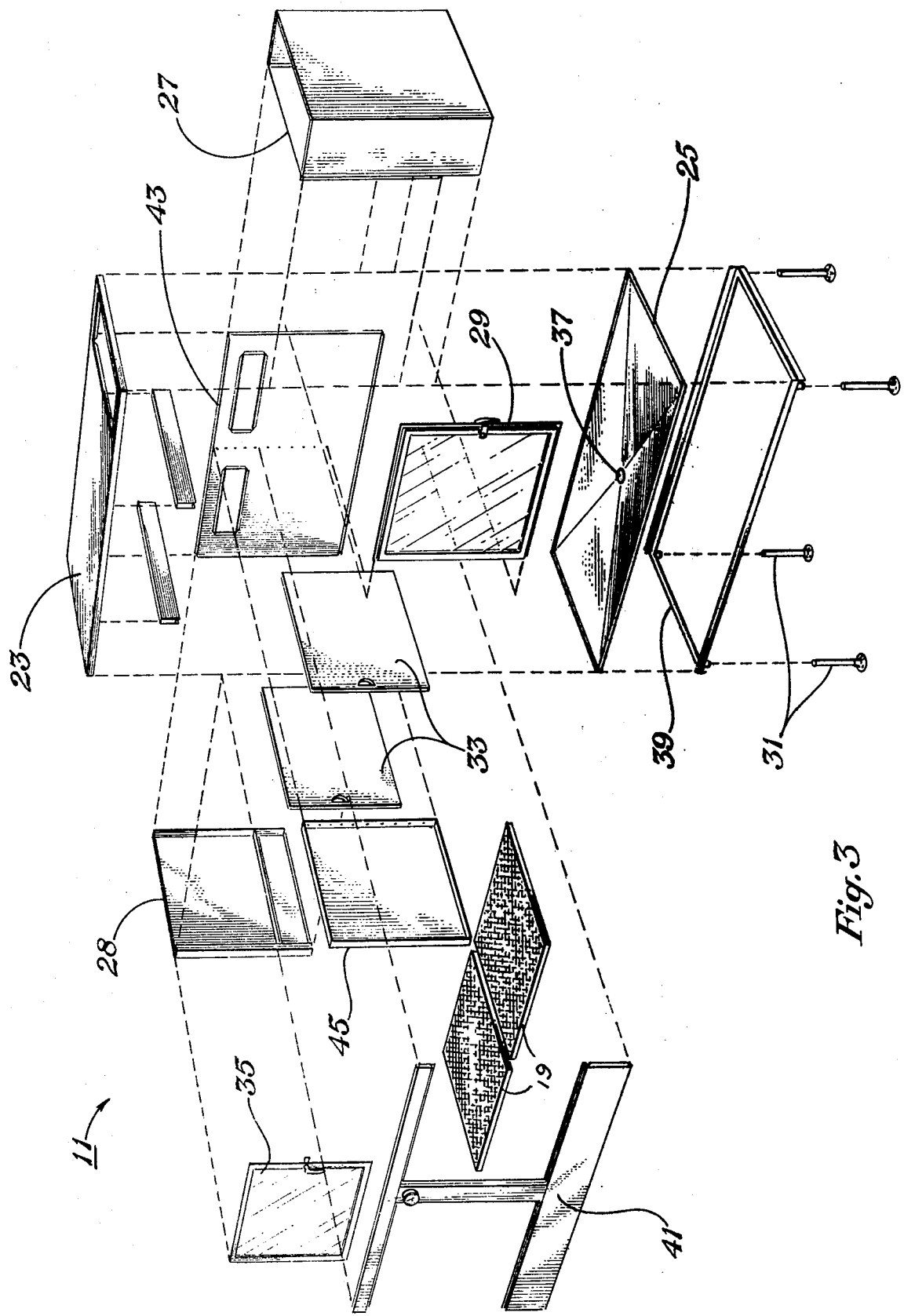
FIG. 3 is an exploded isometric view of an embodiment of this invention.

The apparatus 11 includes a blower 57, FIGS. 1 and 2 for circulating the air past the heating unit and pet and serving as the air circulation means 51. The blower 57 is, preferably, a squirrel cage blower in order to have a more positive flow of air. If desired, other blowers such as fans or positive displacement blowers can be employed. The most economical type is the so-called squirrel cage type blowers. The amount of air that the blower should deliver will depend upon the size of the dryer for the pet. Employing the illustrated version where there are two large chambers 21, each being capable of being sub divided into at least two chambers each, the blower should deliver from 1200 to 2000 cubic feet per minute. Thus, the blower can force the air through the respective plenums and ducts, upwardly through the perforated false bottom and about the animal at a sufficient velocity to dry and fluff the animal's coating. The blower 57 is connected at an inlet end with suitable inlet means, such as duct 59, FIG. 4 for taking in the relatively dry inlet air. As illustrated, the duct 59 extends above a ceiling 61, as into an attic or the like to obtain warm dry air. The blower 57 is connected at its discharge side with the duct means 47 so as to circulate air in heat exchange relationship with the heating means 49 before being blown inwardly through the inlet means 17, upwardly about the pet, and discharged through the outlet means 15.

Figure 4:
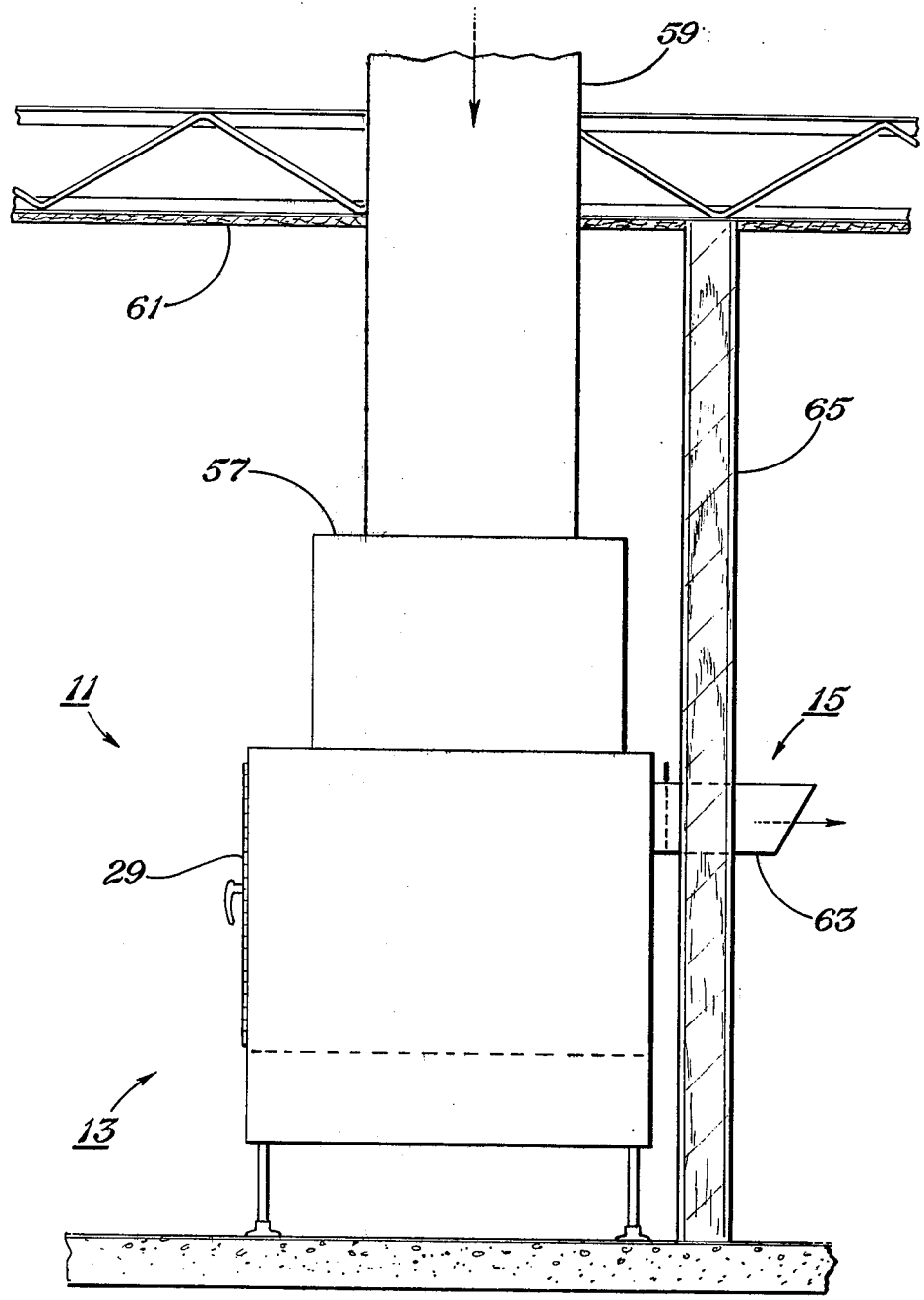
FIG. 4 is a partial side elevational view of an embodiment of this invention showing the respective inlet and outlet connections for the air being circulated past the pet.

The outlet means 15 of the apparatus 11 is connected with suitable discharge means, such as duct 63, FIG. 4, for being discharged exteriorly of the room in which the apparatus 11 is located, as exteriorly of wall 65. In this way, the warm moist air that has been circulated about the pet is discharged into a region that is not in communication with the suction side of the blower so as to minimize the recirculation of the moist air and improve efficiency of the apparatus 11.

As illustrated, the apparatus 11 has a thermometer 69, FIG. 1, such that an attendant or the like may monitor the temperature of the air that is blown past the pet to insure that the controller connected in control of the heating means 49 does not allow the air to become too hot.

Individual timers 69, FIG. 1, can be provided for each compartment to indicate drying time for different animals, according to size, length of hair, and the like. The timers may have adjustable tones to facilitate identifying the compartment to be checked.

In operation, one or both doors are open and one or more pets are emplaced within the cabinet. The door 29 is closed and the blower started to circulate the air upwardly about the pet. The heating unit is turned on so that warm air is circulated about the pet to prevent chilling. If desired, preheating may be employed. The pet can be viewed through the transparent window 35 during the drying and fluffing of its coat. It has been found that most pets find the experience pleasant and not at all distressing. There is no chill and the pet is dried and its coat fluffed in a short time of only about ten to fifteen minutes. This is in contrast to the old time which took an hour or more to dry and fluff the coating of the animal. If desired, a humidistat can be employed to turn off the unit when the humidity is lowered to signify that the pet's coating has been dried. It has been found, however, that a simple timer 69 can be employed as an indicator for the operator or as a means for turning off the unit. The pet is, thereafter, freed by opening the door.

The following examples illustrate embodiments of this invention that have been constructed and found satisfactory.

EXAMPLE I

A single chamber unit was employed with a one-half horsepower blower to deliver 1200 cubic feet per minute when connected as illustrated. The thermostat was a two stage unit that compensated for warmer or colder outside air so as to maintain the same outlet temperature regardless of the temperature of the inlet air. The unit employed a Lennox ES2D Direct Drive model heating unit. The outlet temperature was about 90° F. and satisfactorily dried and fluffed the coating of large and small dogs in ten to fifteen minutes.

EXAMPLE II

In this example, a one-half horsepower blower was also employed but the blower was sized to deliver 2000 cubic feet per minute in a two chamber unit, with removable partitions in each chamber. The same Lennox ES2D Direct Drive model heating unit with a two stage controller was employed and the temperature of the air was at 90° F. Up to four pets could be dried in this unit and still not require more than fifteen minutes for drying and fluffing the coating of the pets.

It was initially thought that it would be necessary to control the humidity of the inlet air by having it pass by the evaporator coils of an air conditioning unit. It was found, however, that this was not necessary although it can be employed if desired.

From the foregoing it can be seen that this invention provides the objects delineated hereinbefore and alleviates the disadvantages of the prior art apparatus in the field of drying and fluffing coatings of pets or the like.

Although the invention has been described with a certain degree of particularity, it should be borne in mind that this descriptive matter is given not by way of limitation but by way of example and that numerous changes in the details of construction and the combination and arrangement of parts may be resorted to without departing from the spirit and scope of this invention.

What is claimed is:

1. Apparatus for drying and fluffing the coating of a pet comprising:
   a. a cabinet having six walls, including top, bottom, a plurality of sides and at least one door facilitating entry of said pet and defining at least one chamber large enough for the pet to stand upright therewithin; said bottom having a drain for draining away liquid water and the like from the pet and facilitating cleaning, said bottom being disposed below each said chamber with no chamber disposed over another, so as to avoid exposing a pet to droppings from a pet thereabove;
   b. exhaust air outlet means disposed adjacent the top of said chamber; said exhaust air outlet means being elongate and disposed such that even if a vertical partition is inserted to divide said chamber into two chambers, said exhaust air is flowed in parallel from each said chamber and without passing in series from one said chamber and pet to another said chamber and pet;
   c. perforated false bottom disposed in said chamber above the bottom thereof so as to define an air passageway and still allow room for said pet to stand on said perforated false bottom; said perforated false bottom having openings smaller than the feet of said pet so as to prevent protrusion of the pet's feet therethrough yet allow passage of warm air upwardly around said pet such that long hair on a pet is dried effectively and without discomfort to the pet; said perforated false bottom having smooth and conforming periphery and fit and being set in place and readily removable for facilitating cleaning; said air passageway being defined beneath each said chamber;
   d. warm air inlet means adjacent the bottom of said chamber and connected with said air passageway below said perforated false bottom for supplying warm air for drying and fluffing the coating of said pet; a duct means being connected with said warm air inlet means, heating means disposed in fluid communication with said duct means such that air is warmed before being circulated past said false bottom and upwardly past said pet, and a high volume air circulation means being connected with said duct means for circulating air in heat exchange relationship with said heating means and thereafter upwardly past said pet; the upstream side of said air circulation means being connected at a first location exteriorly of said cabinet and said exhaust air outlet means being connected exteriorly of said cabinet at a second location spaced from said first location so as to minimize recirculation of the moist air discharged from said cabinet after having been flowed past said pet; and
   e. a transparent window disposed in one of said walls for viewing said pet during the drying and fluffing of its coating.

2. The apparatus of claim 1 wherein said cabinet has a plurality of said chambers disposed in side-by-side relationship; said chambers being disposed in parallel with respect to said air passageway and said exhaust air outlet means with the vertical partitions such that said warm air flowing upwardly past one pet is not flowed in series onto another pet.

3. The apparatus of claim 2 wherein each said chamber has at least one removable partition so as to accommodate one large pet or a plurality of smaller pets.

4. Apparatus for drying and fluffing the coating of a pet comprising:
   a. a cabinet having six walls, including top, bottom, a plurality of sides and at least one door facilitating entry of said pet and defining a plurality of chambers, each large enough for the pet to stand upright therewithin; said chambers being disposed in side-by-side relationships with vertical partitions separating the chambers; at least one of said vertical partitions being removable to facilitate cleaning; said bottom having a drain for draining any liquid water and the like from the pet and facilitating cleaning; said bottom being disposed below each said chamber with no chamber disposed over another, so as to avoid exposing a pet to droppings from a pet thereabove;
   b. exhaust air outlet means adjacent the top of said chambers; said exhaust air outlet means being connected in parallel with each said chamber such that warm air flows in parallel and no air passes in series from one pet to another pet being dried in said chambers;
   c. perforated false bottoms disposed in said chambers above the bottom of said cabinet so as to define an air passageway and still allow room for said pets to stand on said perforated false bottoms in respective chambers; said perforated false bottoms having openings smaller than the feet of said pets so as to prevent protrusion of the pet's feet therethrough yet allow passage of warm air upwardly around said pets such that long hair is dried effectively and without discomfort to said pets; each said perforated false bottom having a smooth and conforming fit and being set in place in said cabinet and readily removable therefrom for facilitating cleaning; said air passageway being defined beneath each said chamber and said exhaust air outlet means being disposed adjacent the top of each said chamber such said warm air flows in parallel through each said chamber and no air passes in series from one pet to another;
   d. warm air inlet means adjacent the bottom of said chamber and connected with said air passageway below said perforated false bottom for supplying warm air for drying and fluffing the coating of said pets; a duct means connected with said warm air inlet means, a heating means disposed in fluid communication with said duct means such that air is warmed before being circulated upwardly past said false bottom and said pets, and a high volume air circulation means connected with said duct means for circulating air in heat exchange relationship with said heating means and thereafter upwardly past said pets; the upstream side of said air circulation means being connected at a first location exteriorly of said cabinet and said exhaust air outlet means being connected exteriorly of said cabinet at a second location spaced from said first location so as to obviate recirculation of the moist air discharged from said cabinet after having been flowed past said pets; and
   e. a transparent window disposed in at least one one of said walls for viewing said pets during the drying and fluffing of their coatings.

* * * * *